(12) United States Patent
Deville

(10) Patent No.: US 6,966,115 B2
(45) Date of Patent: Nov. 22, 2005

(54) PRUNING SCISSORS

(75) Inventor: Antoine Deville, Vieil-Bauge (FR)

(73) Assignee: Deville S.A., (FR)

(*) Notice: Subject to any disclaimer, the term of this patent is extended or adjusted under 35 U.S.C. 154(b) by 20 days.

(21) Appl. No.: 09/945,974

(22) Filed: Sep. 4, 2001

(65) Prior Publication Data

US 2002/0046466 A1 Apr. 25, 2002

(30) Foreign Application Priority Data

Sep. 7, 2000 (FR) ............................ 00 11427

(51) Int. Cl.⁷ ............................................ B26B 13/00
(52) U.S. Cl. ........................ 30/250; 30/270; 76/106.5
(58) Field of Search ...................... 30/270, 50, 250, 30/251, 344, 271, 266, 254, 323, 233, 231, 30/340, 341, 232; 76/106.5

(56) References Cited

U.S. PATENT DOCUMENTS

| | | | | |
|---|---|---|---|---|
| 933,667 A | * | 9/1909 | Ritzler | 30/270 |
| 3,199,364 A | * | 8/1965 | Dew | 74/460 |
| 3,355,200 A | * | 11/1967 | Storch | 403/145 |
| 3,453,731 A | * | 7/1969 | Wertepny | 30/267 |
| 3,650,028 A | * | 3/1972 | La Pointe | 30/238 |
| 4,104,794 A | * | 8/1978 | Carroll | 30/268 |
| 4,891,882 A | * | 1/1990 | Bloom et al. | 30/123.3 |
| 5,454,165 A | * | 10/1995 | Thompson et al. | 30/249 |
| 5,483,747 A | * | 1/1996 | Thompson et al. | 30/254 |
| 5,570,510 A | * | 11/1996 | Linden | 30/250 |
| D399,730 S | * | 10/1998 | Pitre | D8/399 |
| 5,863,008 A | * | 1/1999 | Park | 242/356 |
| 5,946,859 A | * | 9/1999 | Kramer et al. | 49/362 |
| 6,260,277 B1 | * | 7/2001 | Wu | 30/232 |
| D449,223 S | * | 10/2001 | von Sanden | D8/399 |

FOREIGN PATENT DOCUMENTS

| | | |
|---|---|---|
| CH | 96615 | 11/1922 |
| CH | 249065 | 3/1948 |
| CH | 465954 | 1/1969 |
| DE | 20005037 | 7/2000 |
| EP | 0704150 | 4/1996 |

* cited by examiner

Primary Examiner—Allan N. Shoap
Assistant Examiner—Phong Nguyen
(74) Attorney, Agent, or Firm—Bachman & LaPointe, P.C.

(57) ABSTRACT

Pruning scissors comprise a blade and a counter-blade each integral with a grip and mounted so as to be pivoted around a threaded swivel pin cooperating with an adjusting nut of the blade and counter-blade. The nut is rotationally integral with a toothed wheel meshed with a retainer toothed member attached to the pruning scissors counter-blade through a blocking screw. The toothed wheel has an axial opening whose outline corresponds to the external outline of the adjusting nut and is adapted to be inserted around the nut. The retainer toothed member is a toothed gear and the toothed wheel and the toothed gear comprise a respective complementary device adapted to retain the toothed wheel around the nut against any axial movement when the gear is meshed with the toothed wheel.

6 Claims, 3 Drawing Sheets

PRUNING SCISSORS

BACKGROUND OF THE INVENTION

The present invention relates to pruning scissors having a nut retainer device. This system allows to easily set the friction force of the blade and counter-blade while preventing the nut from getting loose.

Pruning scissors are known from EP-B-0 704 150, which comprise a blade and a counter-blade which are each integral with a grip and mounted so as to be pivoted around a threaded swivel pin cooperating with an adjusting nut for tightening the blade and counter-blade, wherein the nut is rotationally integral with a toothed wheel coaxial with the nut and meshed with a retainer toothed member attached to the counterblade through a blocking screw.

Such scissors have a drawback of including an adjusting nut of complex shape and therefore high cost. Specifically, such a nut will have an internal thread for screwing the same onto the blade and counter-blade swivel pin and an external profile allowing it, on the one hand, to be handled by means of a tool such as a wrench or pliers and, on the other hand, to be meshed with the nut retainer.

Another drawback of such pruning scissors is that the retainer member has a circular sector shape with a small center angle such that, when adjusting the blade and counter-blade friction force (unblocking the retainer, adjusting the nut and blocking the retainer), it readily becomes loose from the nut. Then, the user has to disassemble the retainer member in order to re-mesh the retainer member with the nut. This is also the case when partially or entirely disassembling the pruning scissors.

SUMMARY OF THE INVENTION

The present invention aims at providing pruning scissors of the above mentioned type which have a nut retainer system preventing any angular or axial movement of the nut and whose manufacturing cost is reduced. Another object of the present invention is to provide a retainer member which remains meshed with the adjusting nut during friction adjustment operations of the blade and counter-blade, whether such adjustment is critical or not.

According to the present invention, the above mentioned pruning scissors are characterized in that the toothed wheel is separate from the nut, has an axial opening whose outline corresponds to the external outline of the adjusting nut and is adapted to be inserted around the nut, in that the retainer toothed member is a toothed gear and in that the toothed wheel and toothed gear comprise respective complementary means adapted to retain the toothed wheel around the nut against any axial displacement when the gear is meshed with the toothed wheel.

Thus, it is possible to use a conventional nut as the adjusting nut. The toothed wheel has a simple profile and, most important, can be made of a material of lower strength than that of the nut, since the mechanical stress it undergoes is much smaller. Great savings can thus be made by use of the present invention. Moreover, because the retainer toothed member is a gear, it can remain permanently in contact with the toothed wheel during friction adjustment operations of the blade and counter-blade. Finally, the respective complementary means of the gear and toothed wheel prevent any axial movement of the toothed wheel, and the gear system stops all angular movements. Thus, pruning scissors are obtained, which comprise a very simple and reliable system for adjusting the blade and counter-blade tightening.

According to a first embodiment of the present invention, the toothed wheel is integral with a washer interposed between the toothed wheel and the counter-blade of the pruning scissors. The diameter of this washer is greater than the outer diameter of the wheel teeth. The gear is at the same level as the toothed wheel, for instance, by means of a second washer interposed between the scissors counter-blade and the gear.

Thus, the gear teeth cover the peripheral edge of the washer, thereby preventing any axial displacement of the toothed wheel.

According to a second embodiment of the invention, a gear washer, which is coaxial with the gear, is placed in such a position that the gear is positioned between the scissors counter-blade and the gear washer. This gear washer has a greater diameter than the outer diameter of the gear teeth.

Thus, the peripheral edge of the gear washer covers the wheel teeth and prevents any axial displacement of said toothed wheel.

BRIEF DESCRIPTION OF THE DRAWINGS

In the appended drawings, given by way of non limiting example.

DETAILED DESCRIPTION OF THE PREFERRED EMBODIMENT(S)

Figure 1:
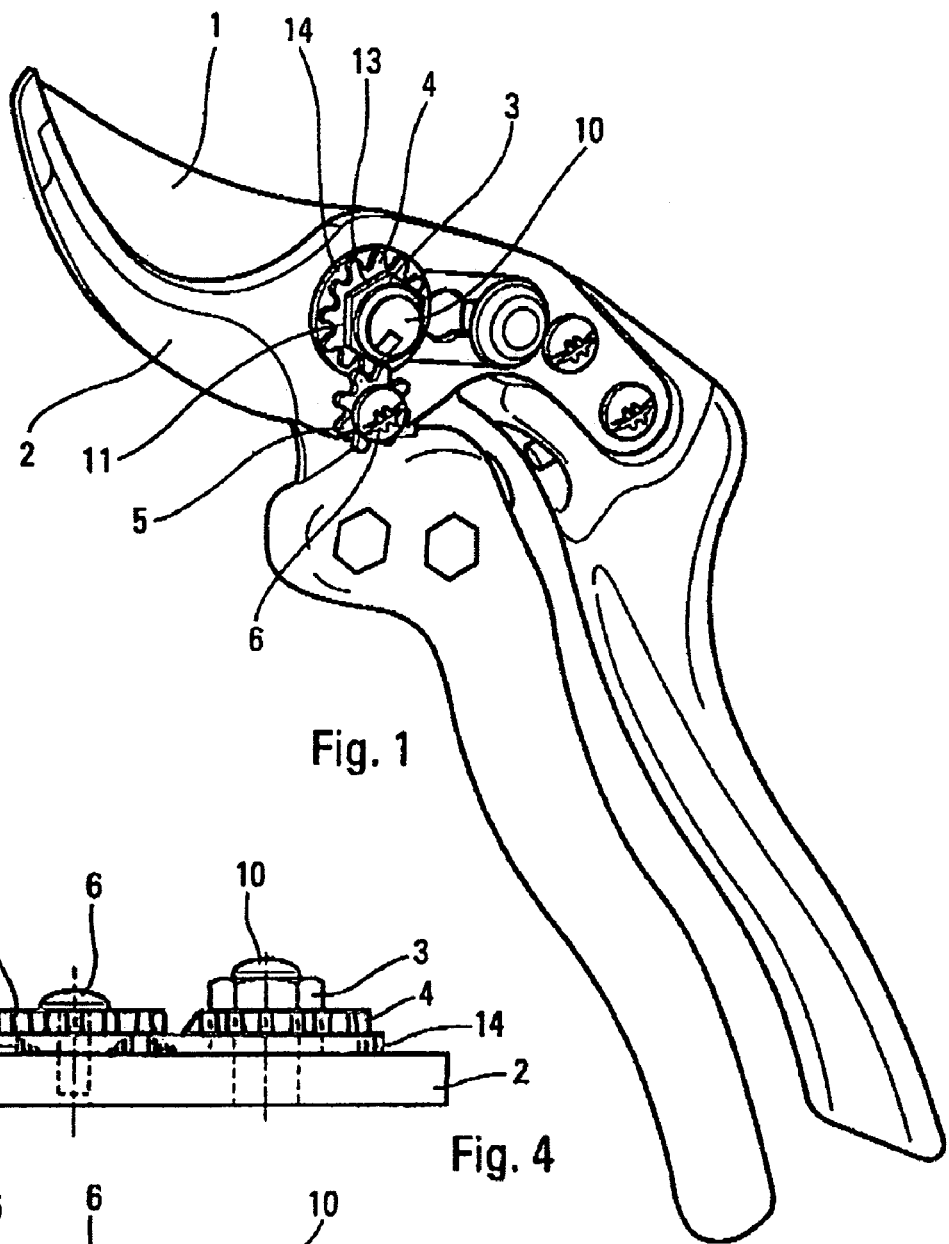
FIG. 1 is a substantially front, perspective view of pruning scissors according to one embodiment of the invention.
Figure 2:
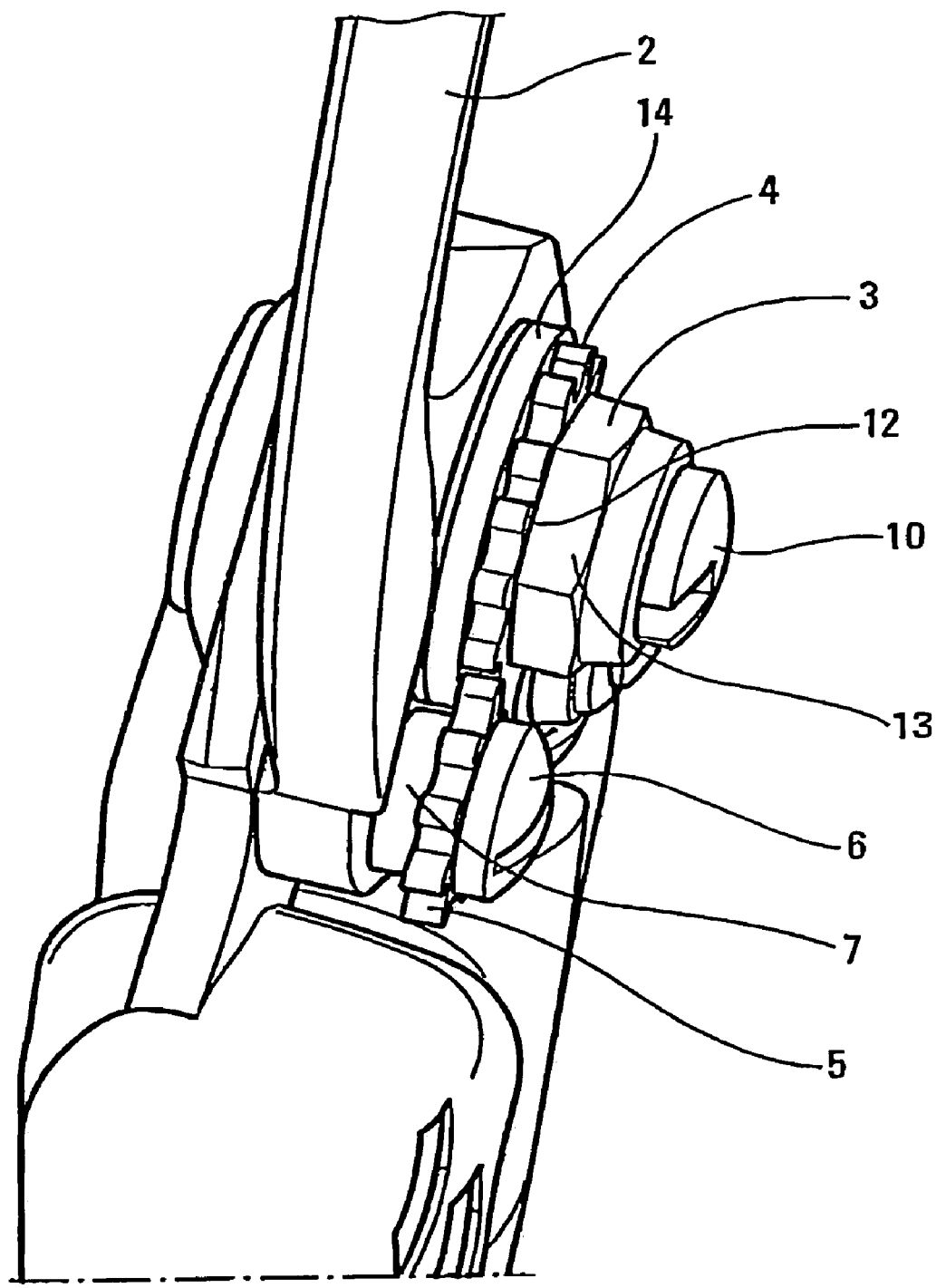
FIG. 2 is an enlarged perspective, substantially lateral view of a feature of the pruning scissors of FIG. 1.
Figure 3:
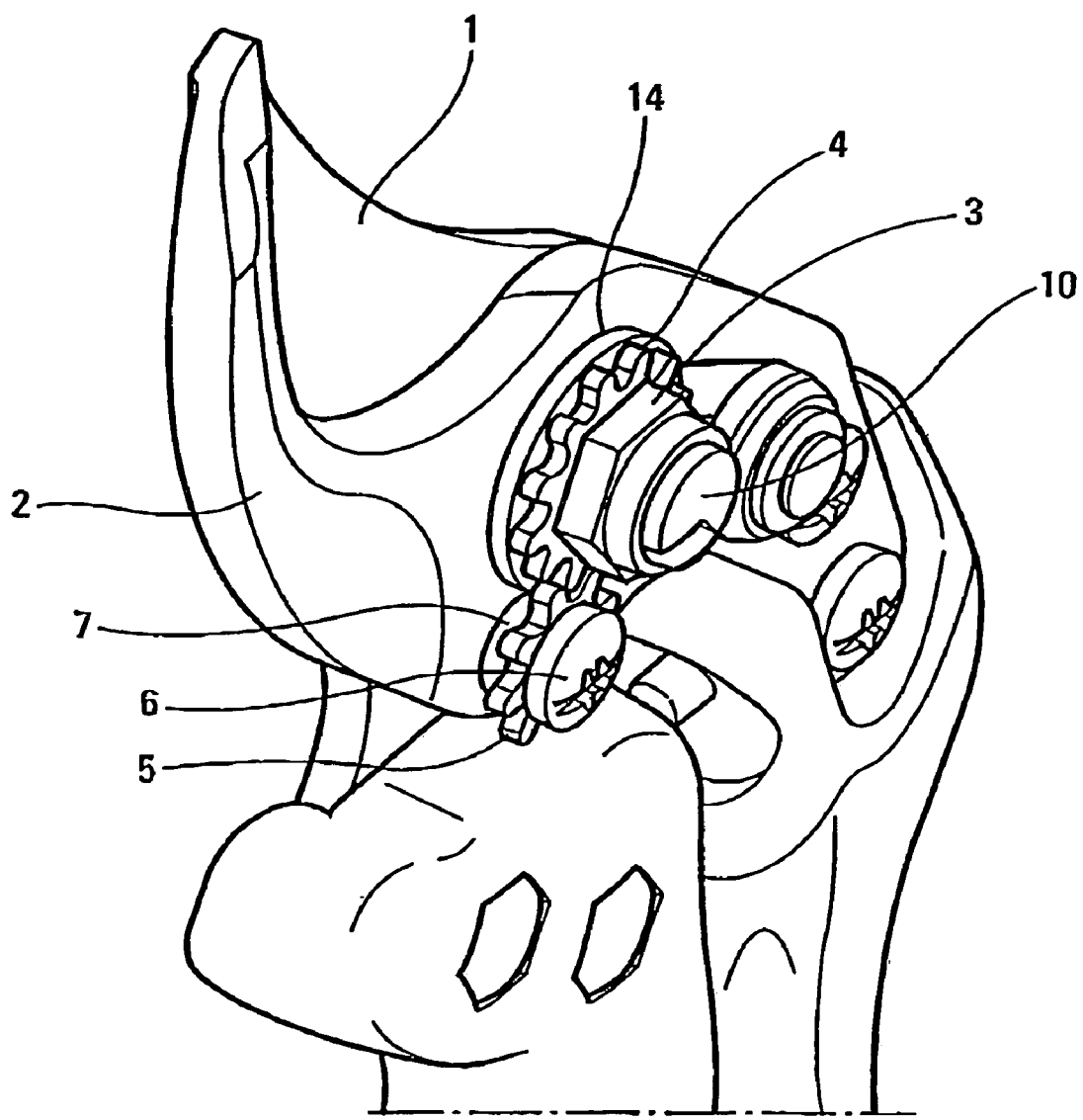
FIG. 3 is a perspective substantially three-quarter view of the feature shown in FIG. 2.

FIGS. 1 to 3 show pruning scissors having a blade 1 and a counter-blade 2. An adjusting nut 3 for fastening blade 1 and counter-blade 2 is screwed to an end of a threaded swivel pin 10 for blade 1 and counter-blade 2. A toothed wheel 4 having an axial opening 11 whose outline 12 corresponds to the external outline 13 of adjusting nut 3 is inserted around nut 3 and therefore made integral with angular movements of adjusting nut 3.

A nut retainer system consisting of a gear 5 is attached to the scissors counter-blade 2 by means of a blocking screw 6. As the gear 5 is toothed along its circumference, it remains meshed within toothed wheel 4 whatever the amplitude of the angular movement for tightening or loosening the nut 3.

In this way, tightening gear 5 by means of blocking screw 6 onto counter-blade 2 of the pruning scissors blocks toothed wheel 4 through a meshing action. Due to the profile of axial opening 11 in toothed wheel 4, adjusting nut 3 is itself stationary, whatever the number of cuts performed by the user of the pruning scissors and the tightening strength of blade 1 and counter-blade 2.

Toothed wheel 4 is axially blocked by complementary respective means provided in toothed wheel 4 and gear 5 more specifically shown in FIGS. 2 to 5.

Figure 4:
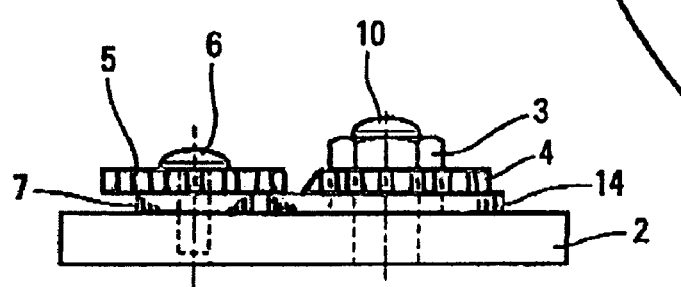
FIG. 4 shows a first embodiment according to the present invention.

According to a first embodiment of the present invention, as shown in FIGS. 2 to 4, the toothed wheel 4, is fixed to a first washer 14 inserted around said adjusting nut 3 and rotating therewith. Washer 14 integral with toothed wheel 4 is axially interposed between toothed wheel 4 and counter-blade 2 of the pruning scissors. The diameter of this washer 14 is greater than the outer diameter of the teeth of toothed wheel 4. Gear 5 is raised to the height of toothed wheel 4 by means of a second washer 7. Thus, washer 14 is kept between scissors counter-blade 2 and gear 5. Toothed wheel 4, since it is integral with washer 14, cannot move axially.

Washer 14 can thus be made integral with toothed wheel 4. Alternatively, washer 14 can be separate from toothed wheel 4 but can be made integral therewith, for example, by gluing.

Figure 5:
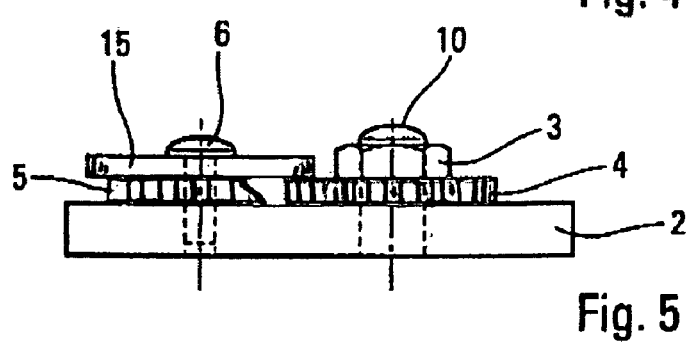
FIG. 5 shows a second embodiment according to the present invention.

According to a second embodiment of the present invention, as shown in FIG. 5, it is possible to use, as means for preventing axial movement of toothed wheel 4 a gear washer 15, coaxial with gear 5, and retained by said blocking screw 6 between a head of blocking screw 6 and said gear 5 with a diameter greater than the outer diameter of the teeth of gear 5. This gear washer 15 is placed in such a way that gear 5 is located between the pruning scissors counter-blade 2 and said gear washer 15. Thus, toothed wheel 4 is retained between the pruning scissors counter-blade 2 and gear washer 15.

Of course, the present invention is not restricted to the above described embodiments.

Gear 5, toothed wheel 4, washer 14, washer 7 and gear washer 15 can for example be made of a fiber-impregnated plastic material.

The second washer 7 can be made integral with gear 5 or separate from said gear. It can be replaced by a corresponding boss formed on the surface of counter-blade 2.

The pruning scissors, through a simple structure (a conventional nut used as the adjusting nut) which is reliable and cost-effective (and a toothed wheel independent of the nut, which can be made of a weaker material than that of the nut), allow the nut to be rotated by a whole revolution or more thereby enabling faster and better cleaning of the pruning scissors and an easy adjustment thereof by maintaining the gear and toothed wheel permanently meshed together, that is without having to disassemble the components.

What is claimed is:

1. Pruning scissors comprising a blade and a counter-blade each integral with a grip and mounted so as to be pivoted around a threaded swivel pin which cooperates with an adjusting nut of the blade and counter-blade, the adjusting nut being rotationally integral with a toothed wheel engaged with a retainer toothed member attached to the counter-blade through a blocking screw, wherein said toothed wheel is separated from the adjusting nut and has an axial opening whose outline corresponds to an external outline of the adjusting nut and is inserted around the adjusting nut and rotates therewith, and wherein the toothed wheel is fixed to a toothed wheel washer which itself has an axial opening whose outline corresponds to an external outline of the adjusting nut, is inserted around said adjusting nut and rotates therewith and is interposed between the counter-blade and the toothed wheel, wherein the toothed member is a toothed gear, and the toothed gear is positioned at the same level as the toothed wheel by a second washer interposed between the counter-blade and the gear, wherein said toothed wheel washer has a radius which is greater than an outer radius of the teeth of said toothed wheel but is less than a distance between a centerline of said adjusting nut and a periphery of said second washer, wherein said second washer has a radius less than a distance between a centerline of said blocking screw and a periphery of said toothed wheel washer, so that when the toothed gear is engaged with the toothed wheel the gear teeth cover the peripheral edge of the toothed wheel washer, thereby retaining the toothed wheel washer and consequently the toothed wheel around the adjusting nut against any axial displacement.

2. Pruning scissors according to claim 1, further comprising said toothed wheel washer being integral with the toothed wheel.

3. Pruning scissors according to claim 1, further comprising said toothed wheel washer being separate from the toothed wheel and being made integral with the toothed wheel by gluing.

4. Pruning scissors according to claim 1, wherein the toothed wheel, the toothed gear, the toothed wheel washer and the second washer are made of a fiber-impregnated plastic material.

5. Pruning scissors comprising a blade and a counter-blade each integral with a grip and mounted so as to be pivoted around a threaded swivel pin which cooperates with an adjusting nut of the blade and counter-blade, the adjusting nut being rotationally integral with a toothed wheel engaged with a retainer toothed member attached to the counter-blade through a blocking screw, wherein said toothed wheel is a toothed ring which is separated from the adjusting nut and has an axial opening whose outline corresponds to an external outline of the adjusting nut and is inserted around the adjusting nut and rotates therewith, wherein the retainer toothed member is a toothed gear, and wherein said pruning scissors further comprises an overlaying gear washer co-axial with the toothed gear and retained by said blocking screw, said overlaying gear washer is positioned so that the toothed gear is located between the counter-blade and the overlaying gear washer, and said overlaying gear washer has a radius greater than an outer radius of the teeth of the toothed gear and less than a distance between a centerline of said blocking screw and a periphery of said adjusting nut, so that when the toothed gear is engaged with the toothed wheel the peripheral edge of the overlaying gear washer covers the toothed wheel teeth, thereby retaining the toothed wheel around the adjusting nut against any axial displacement.

6. Pruning scissors according to claim 5, wherein the toothed wheel, the toothed gear and the gear washer are made of a fiber-impregnated plastic material.

* * * * *